United States Patent
Liu

(10) Patent No.: US 9,170,618 B2
(45) Date of Patent: Oct. 27, 2015

(54) POWER MANAGEMENT CIRCUIT, SERVER, AND POWER MANAGEMENT METHOD THEREOF

(71) Applicant: WISTRON CORP., New Taipei (TW)

(72) Inventor: Kuan-Lin Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 307 days.

(21) Appl. No.: 13/897,424

(22) Filed: May 19, 2013

(65) Prior Publication Data

US 2014/0201513 A1    Jul. 17, 2014

(30) Foreign Application Priority Data

Jan. 16, 2013    (TW) .............................. 102101654 A

(51) Int. Cl.
*G06F 1/26* (2006.01)
*G06F 1/32* (2006.01)
*G06F 9/44* (2006.01)

(52) U.S. Cl.
CPC ................ *G06F 1/26* (2013.01); *G06F 1/3209* (2013.01); *G06F 9/4416* (2013.01)

(58) Field of Classification Search
CPC ....... G06F 1/26; G06F 1/3203; G06F 1/3209; G06F 9/30083; G06F 9/4416; G06F 9/442; Y02B 60/1296
See application file for complete search history.

(56) References Cited

U.S. PATENT DOCUMENTS

| 7,533,281 | B2 | 5/2009 | Hsieh | |
| 7,774,633 | B1* | 8/2010 | Harrenstien et al. | 713/323 |
| 8,793,364 | B1* | 7/2014 | Barkelew et al. | 709/224 |
| 2008/0028199 | A1* | 1/2008 | Armstrong et al. | 713/1 |
| 2011/0040933 | A1* | 2/2011 | Swindell | 711/104 |
| 2012/0131361 | A1* | 5/2012 | Chang | 713/310 |

FOREIGN PATENT DOCUMENTS

| TW | 200707232 A | 2/2007 |
| TW | 200710640 | 3/2007 |
| TW | 201222226 A1 | 6/2007 |

OTHER PUBLICATIONS

Taiwan Patent Office, Office action issued on Mar. 13, 2015.

* cited by examiner

*Primary Examiner* — Dennis M Butler
(74) *Attorney, Agent, or Firm* — Li & Cai Intellectual Property (USA) Office

(57) ABSTRACT

A server is provided in the present disclosure, and the server includes a power module, a motherboard circuit, and a power management circuit. The power management circuit is coupled to the motherboard circuit and the power module. The motherboard circuit receives a remote control signal through a network module and outputs a power-off command to the power management circuit according to the remote control signal. The power management circuit causes the power module to stop supplying power to the motherboard circuit for a predetermined time according to the power-off command. After the predetermined time, the power management circuit causes the power module to supply power again to the motherboard circuit to execute an initialization procedure.

17 Claims, 6 Drawing Sheets

POWER MANAGEMENT CIRCUIT, SERVER, AND POWER MANAGEMENT METHOD THEREOF

BACKGROUND

1. Technical Field

The present disclosure relates to a power management circuit, in particular, to a power management circuit having a power-off function, and a server having the same.

2. Description of Related Art

In general, a server is a computer equipment having a higher operating capability, and can simultaneously provide operating resources or storage spaces through internet to multiple users. The server may be categorized into a File Server, a Database Server, a Mail Server, a Web server, a FTP Server or a Proxy Server based on the type of usage.

A manager may remotely control the operation of a server through network. However, when comes to restart the server or when it is necessary to perform AC power-off due to certain specific procedures, users must enter the machine room to manually shutdown the power of the server, which is quite inconvenient for the manager. Especially for a large machine room where the number of servers is large, it is neither efficient nor convenient for the manager to perform power off and restart procedures.

Some smart multi-receptacle power outlet may provide remote switching operations for user being able to remotely control the power-supplying status of each power receptacle. By using such type of power outlet to supply power to a server may indeed provide a solution scheme for remotely control the powering operation. However, in this scheme it is necessary to install additional smart power outlet in the machine room, as well as recording the corresponding relationship between each power receptacle and the server such that the power operations of the servers can be correspondingly controlled. This not only would increase the installation cost the machine room but also that this type installation is not suitable for large machine room.

In this regard, the inventor perceives that the above problem may be improved, thus the inventor studies deeply and cooperates with the application of theory to disclose the present disclosure that is reasonably designed and can solve efficiently the above problem.

SUMMARY

The present disclosure provides a power management circuit and a server having the same, wherein the server is capable of remotely controlling the power-off operation. In particular, a manager may request the server to execute a power-off procedure through network so as to simulate AC power-off condition to have the server restart.

According to one exemplary embodiment of the present disclosure, a power management circuit is provided, which is adapted to manage the power of a motherboard circuit. The motherboard circuit receives a main power and a standby power from a power module. The motherboard circuit includes a network module and a board control unit. The power management circuit is coupled to the motherboard circuit and the power module. The motherboard circuit receives a remote control signal through the network module, and outputs a power-off command to the power management circuit according to the remote control signal. The power management circuit causes the power module to stop supplying power to the motherboard circuit according to the power-off command, and the power management circuit causes the power module to supply power again to the motherboard circuit after a predetermined time to have the motherboard circuit executing an initialization procedure.

According to one exemplary embodiment of the present disclosure, a server is provided, which includes the power management circuit, the power module, and the motherboard circuit described above. The motherboard circuit includes a network module and a board control unit. The motherboard circuit is coupled to the power module and receives a main power and a standby power from a power module. The power management circuit is coupled to the motherboard circuit and the power module. The motherboard circuit receives a remote control signal through the network module, and outputs a power-off command to the power management circuit according to the remote control signal. The power management circuit causes the power module to stop supplying power to the motherboard circuit according to the power-off command, and the power management circuit causes the power module to supply power again to the motherboard circuit after a predetermined time to have the motherboard circuit executing an initialization procedure.

According to one exemplary embodiment of the present disclosure, when the power module stop supplying the power to the motherboard circuit, the network module and the board control unit are powered off, while the power module continues to supply power to the power management circuit.

According to one exemplary embodiment of the present disclosure, the power management circuit includes a switching unit and a power management unit. The switching unit is coupled between the motherboard circuit and the power module. The power management unit is coupled to the switching unit, the power module and the motherboard circuit. The power management unit receives an operating power and controls the switching unit to cause the power module stops supplying power to the motherboard circuit according to the power-off command.

According to one exemplary embodiment of the present disclosure, the power management unit is coupled to the board control unit and receives the power-off command through the board control unit. The switching unit is disposed at a power supplying path formed between the motherboard circuit and the power module, and is used for selectively conducting the power supplying path, wherein when the power management unit receives the power-off command, the power management unit cuts-off the switching unit so as to stop supplying the power to the motherboard circuit, and conducts the switching unit to have the power module supplying power again to the motherboard circuit after the predetermined time.

According to one exemplary embodiment of the present disclosure, the power management unit includes a control unit, a timer, and a memory unit. The control unit is coupled to the switching unit, the timer, and the memory unit. The control unit is used for determining whether the switching unit is turned on.

According to one exemplary embodiment of the present disclosure, when the board control unit receives the power-off command, the board control unit records a remote booting procedure, and causes the motherboard circuit to execute the initialization procedure at restart according to the remote booting procedure.

According to one exemplary embodiment of the present disclosure, after the motherboard circuit executes the initialization procedure, the board control unit outputs a restart message through the network module.

According to one exemplary embodiment of the present disclosure, the power management circuit and the motherboard circuit may be integrated on a motherboard.

According to one exemplary embodiment of the present disclosure, the power management circuit and the power module may be integrated in a power supply.

According to one exemplary embodiment of the present disclosure, when the power module stop supplying power to the motherboard circuit, the power module stops supplying the main power and the standby power to the motherboard circuit.

According to another exemplary embodiment of the present disclosure, a power management method is provided, which is adapted for a server. The server includes a power module, a motherboard circuit, and a power management circuit. The power management method includes the following steps: receiving a remote control signal through a motherboard circuit; outputting a power-off command to a power management circuit according to the remote control signal; driving the power management circuit to cause the power module to stop supplying a main power and a standby power to the motherboard circuit according to the power-off command; after a predetermined time driving the power management circuit to cause the power module to supply power again to the motherboard after a predetermined time to have the motherboard circuit executing an initialization procedure.

To sum, the present disclosure can enable the server become capable of remote power management, and a manager may send a power-off command through a network to the server to have the server executing an initialization procedure after the server is powered off, so that the power management convenience of the server may be greatly enhanced.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
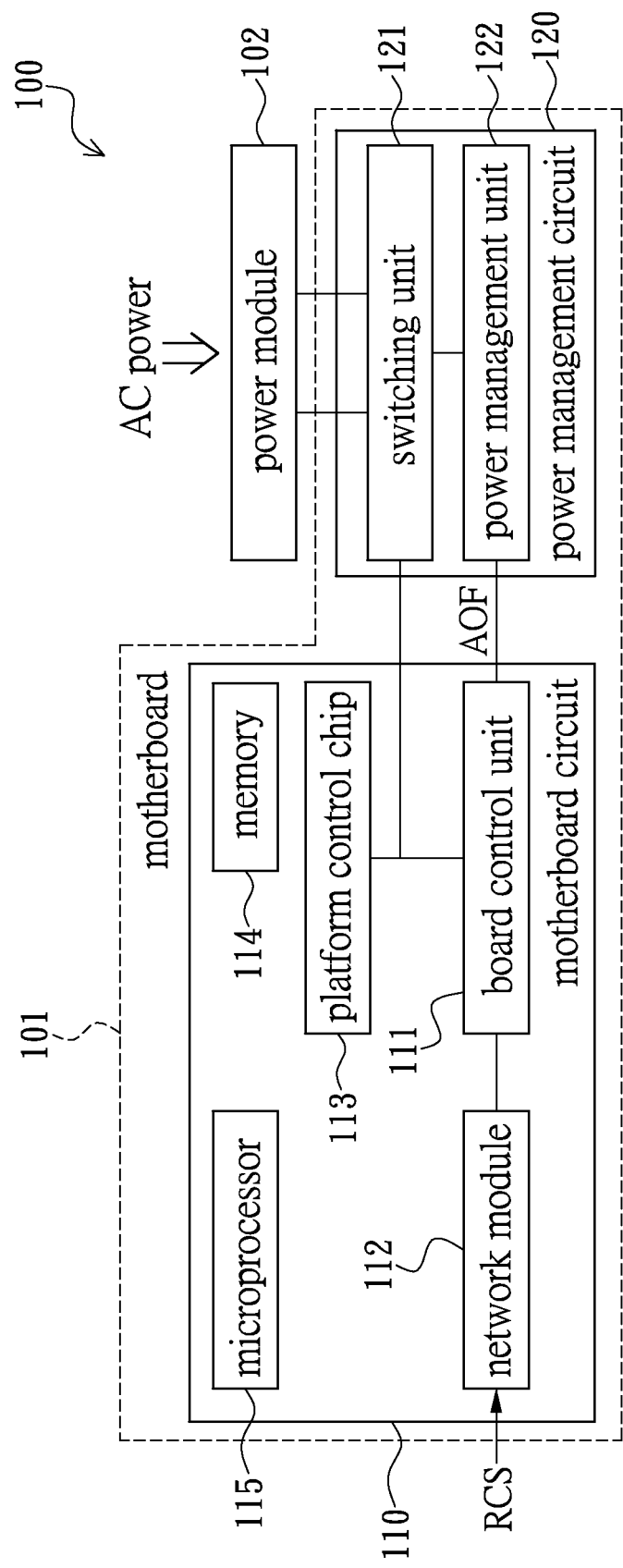
FIG. 1 is a functional block diagram of a server according to the first exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

First Exemplary Embodiment

FIG. 1 is a functional block diagram of a server according to the first exemplary embodiment of the present disclosure. The server 100 includes a power module 102, a motherboard circuit 110, and a power management circuit 120, wherein the motherboard circuit 110 further includes a board control unit 111, a network module 112, a platform control chip 113, a memory 114, and a microprocessor 115. The power management circuit 120 includes a switching unit 121 and a power management unit 122. In the instant embodiment, the motherboard circuit 110 and the power management circuit 120 may be integrated on a motherboard 101. The power module 102 may for example be a power supply, and can receive an AC power. The power module 102 is connected to the motherboard 101 through a connector so as to supply power to the motherboard 101.

The board control unit 111 is coupled to the network module 112 and the platform control chip 113, and can receive a main power and a standby power from the power module 102. The board control unit 111 may be for example, a board management controller (BMC) and is a part of an intelligent platform management interface (IPMI) structure. The board control unit 111 is a control chip embedded in a computer or in a server and can be used to sense a temperature, control the working states such as power operating mode and fan speed, and etc., however the instant embodiment is not limited thereto. The network module 112 may be a wired or wireless network transmission module, which may be connected to a remote control system through a network. A manager may send a remote control signal RCS to the server 100 through the remote control system to perform a power-off operation.

The power management circuit 120 is coupled to the motherboard circuit 110 and the power module 102, wherein the power management unit 122 is coupled to the board control unit 111 and the switching unit 121, and controls the operation of the switching unit 121 according to the power-off command AOF outputted by the board control unit 111. In addition, the power management unit 122 is also coupled to the power module 102 and can directly obtain an independent operating power from the power module 102. In other words, it is not necessary for the power management unit 122 to obtain an operating power through the motherboard circuit 110.

The switching unit 121 is coupled between the motherboard circuit 110 and the power module 102. The switching unit 121 is disposed at a power supplying path formed between the power module 102 and the motherboard circuit 110. When the switching unit 121 is turned on, conducting the power supplying path, the power module 102 can supply power through the power supplying path to the motherboard circuit 110; when the switching unit 121 is turned off, cutting-off the power supplying path, the power module 102 can not supply power (including the main power and the standby power) to the motherboard circuit 110. In other words, when the switching unit 121 is turned off, the motherboard circuit 110 presents in an AC power-off state instead of a sleep state.

The power management circuit 120 can obtain the operating power directly from the power module 102, and the power management circuit 120 may operate normally regardless whether the switching unit 121 is turned on or off. Therefore, when the power module 102 stop supplying power to the motherboard circuit 110, the network module 112 and the board control unit 111 are powered off, while the power module 102 continues to supply power to the power management circuit 120.

When the motherboard circuit 110 of the server 100 receives a remote control signal RCS outputted by a remote control system through the network module 112, the board control unit 111 outputs a power-off command AOF to the power management unit 122 according to the remote control signal RCS. The power management unit 122 controls the switching unit 121 to be turned off according to the power-off command AOF, so that the power module 102 stops supplying the power to the motherboard circuit 110 continuously for a predetermined time. At this moment, the motherboard circuit 110 presents in the power-off state instead of sleep state. After the motherboard circuit 110 is powered off, the power management unit 122 start to count time using a timer, and. The power management unit 122 then turns on the switching unit 121 after the predetermined time to drive the power module 102 supply power again to the motherboard circuit 110 to have the motherboard circuit 110 execute an initialization procedure (booting procedure).

Since the operating power obtained by the power management circuit 120 are independent, thus under situation where the motherboard circuit 110 is powered off, the power module 102 may still continuously supply power to the power management circuit 120 to maintain a normal operation of the power management circuit 120. The power management circuit 120 may determine the power-off time (i.e., the predetermined time) of the motherboard circuit 110 and the power resupplying mode according to the needs of the manager.

When the board control unit 111 receives the remote control signal RCS, it may correspondingly output the power-off command AOF and record a remote booting procedure setup by the manager. When the motherboard circuit 110 executes the initialization procedure (i.e., restart) next time, it will execute the booting procedure according to the remote booting procedure. For example, the motherboard circuit 110 may restore the setting prior to the power-off, or setup a new parameters according to the needs of the manager, or setup another booting mode. The setting of remote booting procedure may be configured according to the need of the manager, and the instant embodiment is not limited thereto.

In addition, when the motherboard circuit 110 executes the initialization procedure, the board control unit 111 may determine whether the initialization procedure at this time is triggered by the remote control signal RCS according to the remote booting procedure stored therein. If so, the initialization procedure is executed according to the remote booting procedure that has been set. If not, the initialization procedure is performed under normal mode.

After the motherboard circuit 110 executes the initialization procedure, the board control unit 111 may output a restart message to the remote control system through the network module 112 so as to notify the manager. The remote control system may correspondingly install a user interface to control the server connected so as to enable the manager managing several servers at one time.

As can be known from the above, when the server 100 receives the remote control signal RCS, the server 100 will cause the power management unit 122 to execute an internal power-off operation to power off the motherboard 101 of the server 100 for a period of time. Then supply power the motherboard 101 again to have the motherboard 101 execute the initialization procedure. By using the technique described in the embodiment of the present disclosure, the manager may send a command to the target server 100 through a network to executing the power off and restart operations to have the motherboard 101 renders the effect of AC power-off without the need to manually shut down the AC power.

Figure 2:
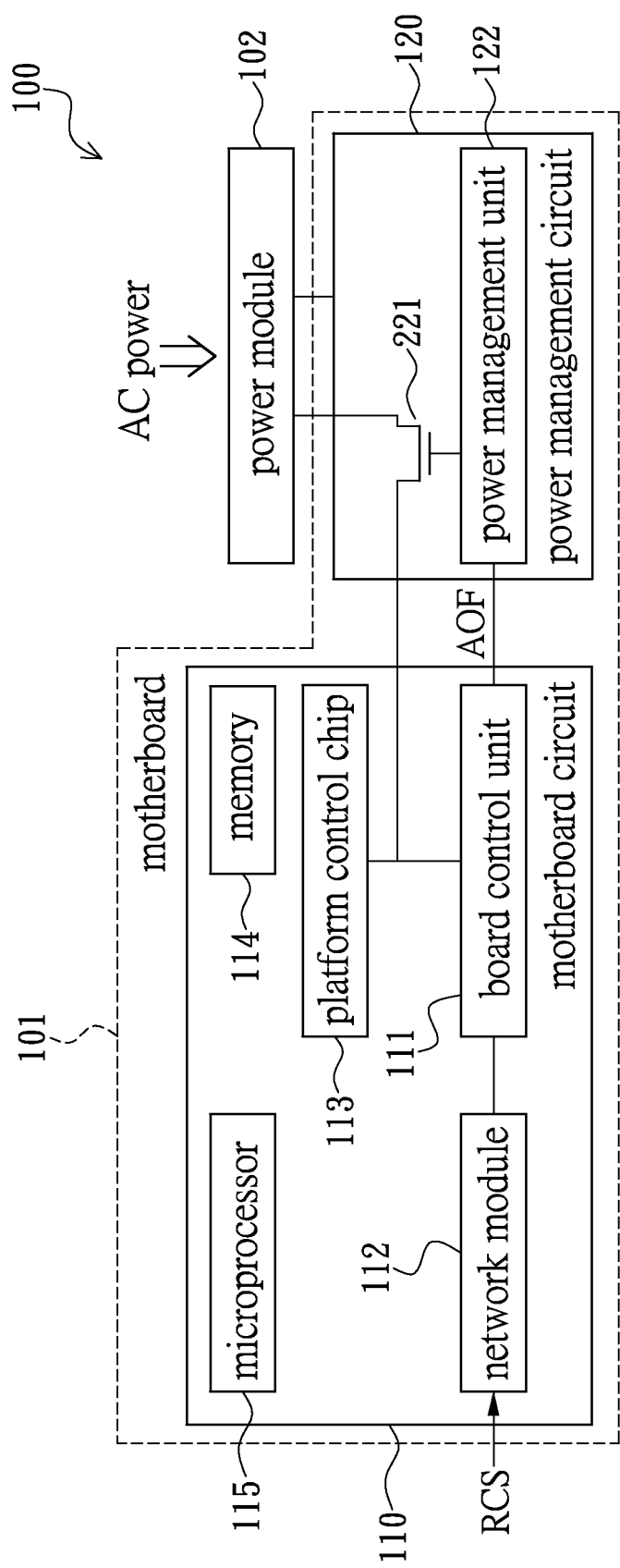
FIG. 2 is a circuit schematic diagram of a server according to the first exemplary embodiment of the present disclosure.

In the instant embodiment, the primary function of the switching unit 121 is selectively conduct the power supplying path formed between the power module 102 and the motherboard circuit 110. The switching unit 121 may be implemented by a transistor (for example, a PMOS transistor, a NMOS transistor, a PNP transistor, a NPN transistor or a power transistor), a switching component, a switching circuit, or a logical switching element, and the instant embodiment is not limited thereto. Please refer to FIG. 2. FIG. 2 is a circuit schematic diagram of a server according to the first exemplary embodiment of the present disclosure. In FIG. 2, the switching unit 121 is, for example, a NMOS transistor 221. Two terminals of the NMOS transistor 221 are respectively coupled to the motherboard circuit 110 and the power module 102, and the gate of the NMOS transistor 221 is coupled to the power management unit 122. The power management unit 122 may turn on or off the NMOS transistor 221 according to the power-off command AOF. FIG. 2 shows only an implementation of the switching unit 221. The instant embodiment does not limit that type of implementation associated with the switching unit 221.

Figure 3:
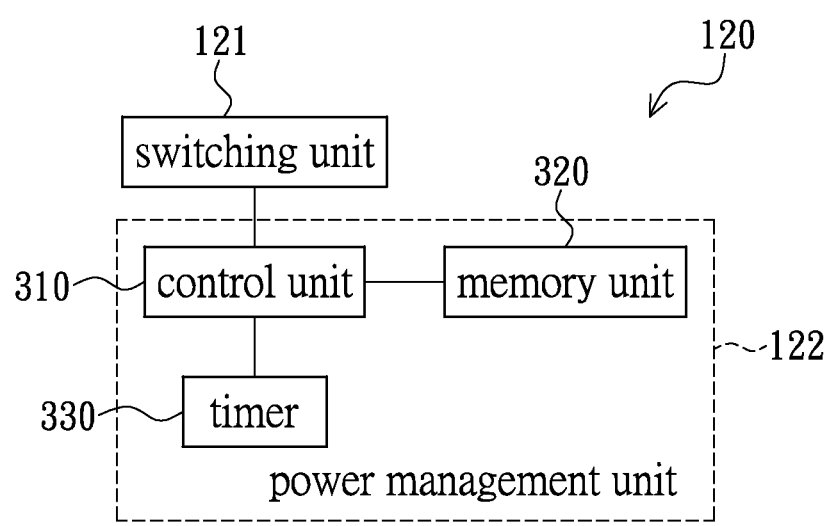
FIG. 3 is a functional block diagram of a power management circuit according to the first exemplary embodiment of the present disclosure.

Please refer to FIG. 3. FIG. 3 is a functional block diagram of a power management circuit 120 according to the first exemplary embodiment of the present disclosure. The power management circuit 120 includes a control unit 310, a timer 330, and a memory unit 320, wherein the control unit 310 is coupled to the timer 330 and the memory unit 320. The power management circuit 120 is mainly used to temporarily interrupt the power supplied by the power module 102 to the motherboard circuit 110 according to the power-off command outputted by the motherboard circuit 110, to have the motherboard circuit 110 stimulate the power-off state. The timer 330 is used for counting the power-off time (i.e., the predetermined time) associated with the motherboard circuit 110, while the memory unit 320 is used for storing the related power-setting parameters. The power management circuit 120 of the instant embodiment has a timer function and is capable of controlling the operation of the switching unit 121. The power management circuit 120 may be implemented by a micro-processor or an embedded controller. For example, the power management circuit 120 may be an Advanced Configuration and Power Interface (ACPI) control chip, and the present disclosure does not limit the implementation method of the power management circuit 120.

In the instant embodiment, the motherboard circuit 110 and the power management circuit 120 can be integrated on the motherboard 101. The specification of the motherboard 101 may be AT (Advanced Technology), Baby-AT, ATX (Advanced Technology Extended), microATX, FlexATX, Mini-ITX, Nano-ITX, Pico-ITX, mobile-ITX, BTX (Balanced Technology Extended), MicroBTX, PicoBTX, DTX, Mini-DTX, ETX, Extended ATX, LPX, Mini-LPX, PC/104, PC/104plus, NLX, WTX, XTX etc., and the instant embodiment is not limited thereto.

The power module 102 may be connected to the power receptacle on the motherboard 101 and supplies the main power and the standby power to the motherboard circuit 110. The power receptacle on the motherboard 101 may be an ATX power receptacle or an AT power receptacle. The motherboard 101 of different specification may have power receptacles of different specification adapted for different plugs and the present disclosure is not limited thereto. The power management of the motherboard 101 may also support the Advanced Configuration and Power Interface (ACPI) and perform software and hardware power management.

In the instant embodiment, the motherboard 101 mainly includes the motherboard circuit 110 and the power management circuit 120, wherein the motherboard circuit 110 not only has a specific serving functionality but also used as a data transmission circuit for the power management circuit 120. A remote control system may be directly connected to a server 100 which is to be operated through the network, and sends a command to the power management circuit 120 therein so as to perform a power-off operation. There is no need for the manager to use an external power supplying equipment (for example, smart power receptacle) when performing an AC power-off operation. The motherboard 101 may further include components including but not limited to a platform controller hub (PCH) 113, a microprocessor 115, and a memory 114, as shown in FIG. 1. The motherboard 101 may have different circuit structures and components according to the actual design and operational needs. FIG. 1 is merely a schematic diagram and the instant embodiment does not limit the type of circuit structure of the motherboard 101.

The network module 112 may be implemented with circuit modules, chips or discrete components, and the type of network module 112 may be an independent module or may be integrated in the motherboard 101 of the system, and the instant embodiment is not limited thereto.

Second Exemplary Embodiment

Figure 4:
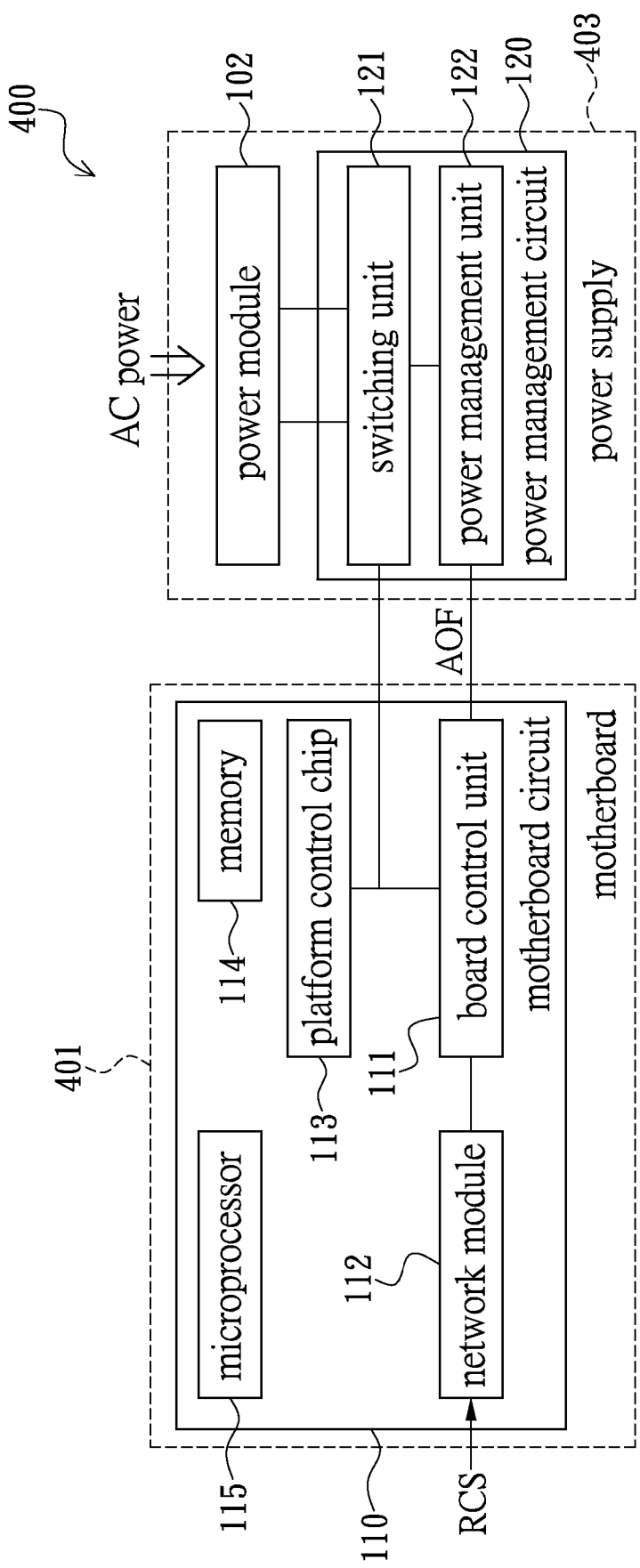
FIG. 4 is a schematic diagram of a server according to the second embodiment of the present disclosure.

Please refer to FIG. 4. FIG. 4 is a schematic diagram of a server according to the second embodiment of the present disclosure. The server 400 includes a motherboard 401 and a power supply 403. The motherboard 401 includes a motherboard circuit 110, while the power management circuit 120 and the power module 102 are integrated in the power supply 403. The operation of FIG. 4 is similar to FIG. 1 with difference in that the power management circuit 120 and the power module 102 are integrated in the power supply 403. Based on the explanation of aforementioned embodiment, those skilled in the art shall be able to infer the technique detail of the second exemplary embodiment, and further descriptions are hereby omitted.

Third Exemplary Embodiment

Figure 5:
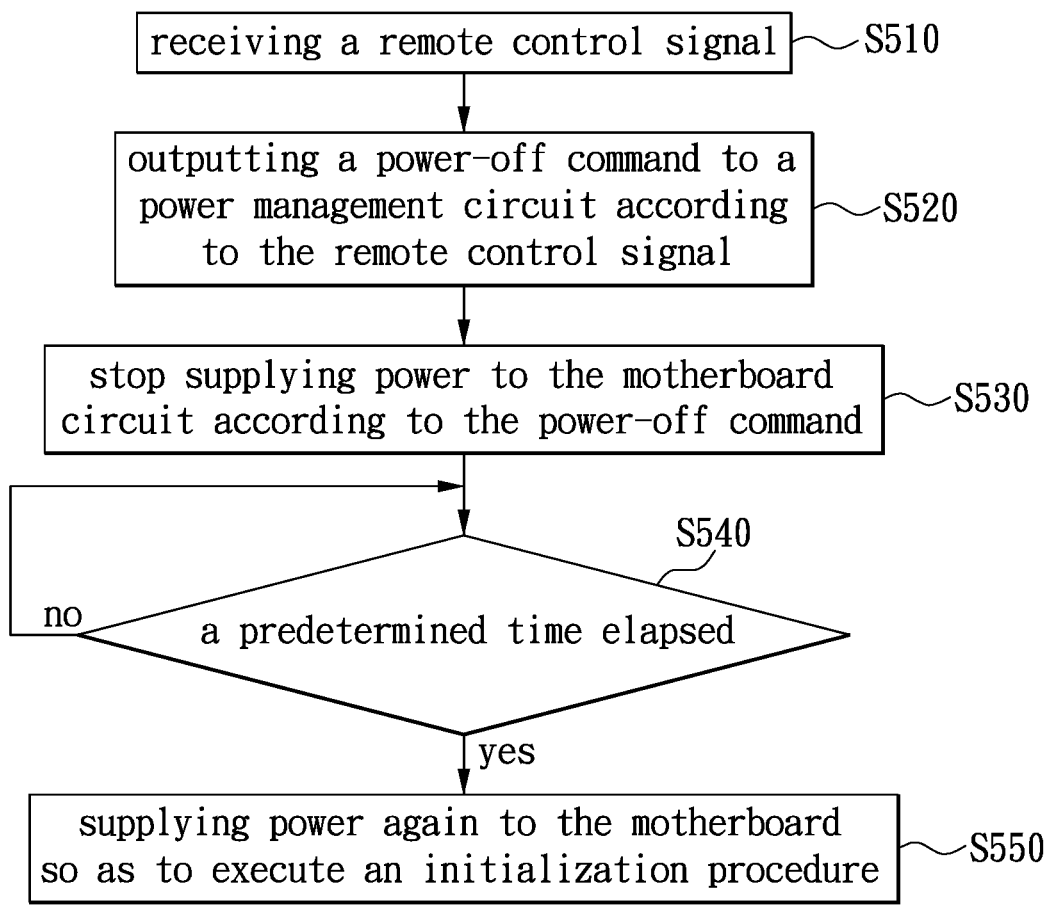
FIG. 5 is a flowchart of a power management method according to the third exemplary embodiment of the present disclosure.

A first power management method may be generalized from the aforementioned embodiments. Please refer to FIG. 1 and FIG. 5 simultaneously. FIG. 5 is a flowchart of a power management method according to the third exemplary embodiment of the present disclosure. The power management method provided in the instant embodiment is adapted for the server 100 of FIG. 1. In step S510, a remote control signal RCS is received through the motherboard circuit 110. In step S520, the motherboard circuit 110 outputs a power-off command AOF to the power management circuit 120 according to the remote control signal RCS. Next, in step S530, the power management circuit 120 causes the power module 102 to stop supplying power (including the main power and the sleep power) to the motherboard circuit 110 or a predetermined time according to the power-off command AOF. Then, in step S540, the power management circuit 120 begins to count the time and determines whether the predetermined time has elapsed. If the power-off duration has exceeded the predetermined time, executes step S550 and supply power again to the motherboard circuit 110 to have the motherboard circuit 110 executing an initialization procedure; if not, the power management circuit 120 continues to count the time.

Figure 6:
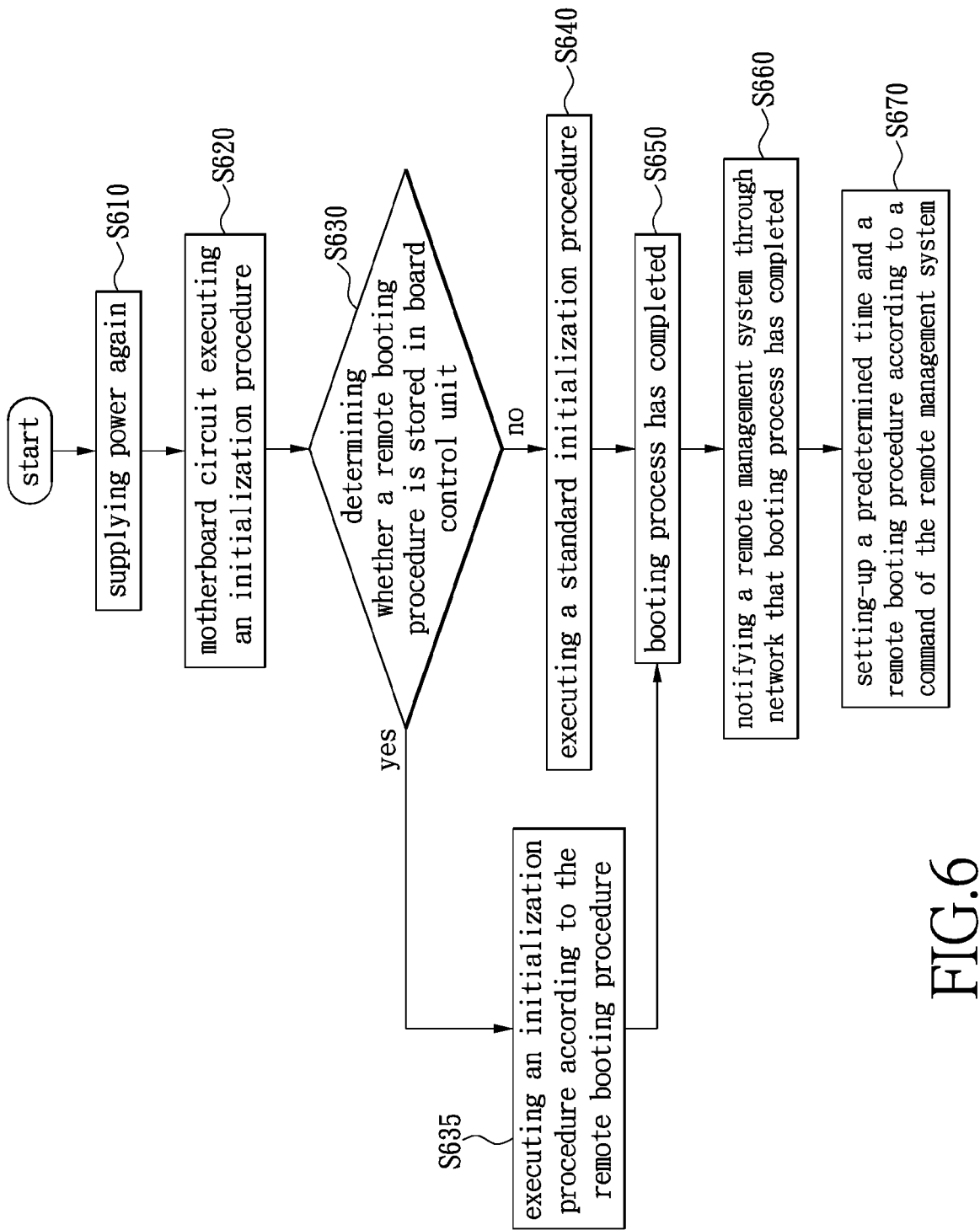
FIG. 6 is a flowchart of an initialization procedure according to the third exemplary embodiment of the present disclosure.

The step of having the motherboard circuit 110 executing the initialization procedure depicted in step S550 may be further illustrated by FIG. 6. FIG. 6 is a flow chart of an initialization procedure according to the third exemplary embodiment of the present disclosure. At first, the power module 102 supplies power again to the motherboard circuit 110 to execute the initialization procedure (step S610, S620). Then, determines whether a remote booting procedure is stored in the board control unit 111 (step S630). If so, the initialization procedure is executed according to the remote booting procedure (step S635); if not, a normal initialization procedure is performed (step S640). After the booting procedure is completed (step S650), a restart message is sent to a remote control system through the network to notify the manager that the server 100 has been restarted (step S660). The manager may transmit related setting configuration k to the server 100 through the network. The server 100 the correspondingly setup parameters such as the predetermined time for power-off and the remote booting procedure according to the command of the remote control system.

After the description of the above embodiments, those skilled in the art shall easily infer the operation detail of the power management method in the instant embodiment, and further descriptions are hereby omitted. In addition, it is worth noting that the coupling relationship between the aforementioned components includes direct and indirect electrical connections, and the scope of the present disclosure does not limit the type of connection employed so long as the necessary electrical signal transmission can be attained. The technical means described in the aforementioned embodiments may be combined or used independently. Furthermore, the associated components may be added, removed, modified or replaced based on the needs of specific functional and design requirements, and the present disclosure should not be limited thereto. Based on the explanations provided by aforementioned embodiments, those skilled in the art should be able to deduce other embodiments according to the disclosure of the present invention, and further descriptions are therefore omitted.

In summary, a manager may perform a directly remote AC power-off operation through a network using the server and the power management circuit thereof provided in the present disclosure. Such that the motherboard can be driven to restart the initialization procedure. By using the technical means of the present disclosure, the manager can attain an AC power-off effect without the need to manually cut-off the AC power of a server, and effectively enhancing the convenience of the power management for a server.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A power management circuit, adapted to manage power of a motherboard circuit, the motherboard circuit receiving a main power and a standby power from a power module, the motherboard circuit comprising a network module and a board control unit, characterized by that the power management circuit is coupled to the motherboard circuit and the power module, the motherboard circuit receiving a remote control signal through the network module and outputting a power-off command to the power management circuit according to the remote control signal, the power management circuit causing the power module to stop supplying power to the motherboard circuit according to the power-off command, and causing the power module to supply power again to the motherboard circuit after a predetermined time to have the motherboard circuit executing an initialization procedure;
wherein the power management circuit comprises:
a switching unit, coupled between the motherboard circuit and the power module; and
a power management unit, coupled to the switching unit, the power module, and the motherboard circuit, the power management unit receiving an operating power and controlling the switching unit to cause the power module to stop supplying power to the motherboard circuit according to the power-off command;
wherein the power management unit comprises:
a control unit, coupled to the switching unit, controlling the operations of the switching unit;
a timer, coupled to the control unit; and
a memory unit, coupled to the control unit.

2. The power management circuit according to claim 1, wherein when the power module stops supplying power to the motherboard circuit, power off the network module and the board control unit while the power module continues to supply power to the power management circuit.

3. The power management circuit according to claim 1, wherein the power management unit is coupled to the board control unit and receives the power-off command through the board control unit, the switching unit disposed on a power supplying path formed between the motherboard circuit and the power module, and used for selectively conducting the power supplying path, wherein when the power management unit receives the power-off command, the power management unit cuts-off the switching unit to stop supplying power to the motherboard circuit and conducts the switching unit to have the power module supplying power again to the motherboard circuit after the predetermined time.

4. The power management circuit according to claim 1, wherein when the board control unit receives the remote control signal, the board control unit records a remote booting procedure and causes the motherboard circuit to execute the initialization procedure at restart according to the remote booting procedure.

5. The power management circuit according to claim 4, wherein the board control unit outputs a restart message through the network module after the motherboard circuit executes the initialization procedure.

6. The power management circuit according to claim 1, wherein the power management circuit and the motherboard circuit are integrated on a motherboard.

7. The power management circuit according to claim 1, wherein the power management circuit and the power module are integrated in a power supply.

8. The power management circuit according to claim 1, wherein when the power module stops supplying power to the motherboard circuit, the power module stops supplying the main power and the standby power to the power management circuit.

9. A server, comprising:
a power module;
a motherboard circuit, comprising a network module and a board control unit, the motherboard circuit coupled to the power module to receive a main power and a standby power therefrom; and
a power management circuit, coupled to the motherboard circuit and the power module;
wherein the motherboard circuit receives a remote control signal through the network module and outputs a power-off command to the power management circuit according to the remote control signal, the power management circuit causing the power module to stop supplying power to the motherboard circuit according to the power-off command, and causing the power module to supply power again to the motherboard circuit after a predetermined time to have the motherboard circuit executing an initialization procedure;
wherein the power management circuit comprises:
a switching unit, coupled between the motherboard circuit and the power module;
a power management unit, coupled to the switching unit, the power module, and the motherboard circuit, the power management unit receiving an operating power and controlling the switching unit to cause the power module to stop supplying power to the motherboard circuit according to the power-off command;
wherein the power management unit comprises:
a control unit, coupled to the switching unit, controlling the operations of the switching unit;
a timer, coupled to the control unit; and
a memory unit, coupled to the control unit.

10. The server according to claim 9, wherein when the power module stops supplying power to the motherboard circuit, power off the network module and the board control unit while the power module continue to supply power to the power management circuit.

11. The server according to claim 9, wherein the power management unit is coupled to the board control unit and receives the power-off command through the board control unit, the switching unit disposed on a power supplying path formed between the motherboard circuit and the power module, and used for selectively conducting the power supplying path, wherein when the power management unit receives the power-off command, the power management unit cuts-off the switching unit to stop supplying power to the motherboard circuit and conducts the switching unit to have the power module supplying power again to the motherboard circuit after a predetermined time.

12. The server according to claim 9, wherein when the board control unit receives the remote control signal, the board control unit records a remote booting procedure and causes the motherboard circuit to execute the initialization procedure at restart according to the remote booting procedure.

13. The server according to claim 12, wherein the board control unit outputs a restart message through the network module after the motherboard circuit executes the initialization procedure.

14. The server according to claim 9, wherein the power management circuit and the motherboard circuit are integrated on a motherboard.

15. The server according to claim 9, wherein the power management circuit and the power module are integrated in a power supply.

16. The server according to claim 9, wherein when the power module stops supplying power to the motherboard circuit, the power module stops supplying the main power and the standby power to the power management circuit.

17. A power management method, adapted for a server, the server comprising a power module, a motherboard circuit, and a power management circuit, the power management method comprising:
receiving a remote control signal through the motherboard circuit;
outputting a power-off command to the power management circuit according to the remote control signal;

driving the power management circuit to cause the power module to stop supplying a main power and a standby power to the motherboard circuit according to the power-off command; and driving the power management circuit to cause the power module to supply power again to the motherboard circuit after a predetermined time to have the motherboard circuit executing an initialization procedure;

wherein the power management circuit comprises:
   a switching unit, coupled between the motherboard circuit and the power module;
   a power management unit, coupled to the switching unit, the power module, and the motherboard circuit, the power management unit receiving an operating power and controlling the switching unit to cause the power module to stop supplying power to the motherboard circuit according to the power-off command;

wherein the power management unit comprises:
   a control unit, coupled to the switching unit, controlling the operations of the switching unit;
   a timer, coupled to the control unit; and
   a memory unit, coupled to the control unit.

* * * * *